United States Patent [19]

Jialanella

[11] Patent Number: 5,741,594
[45] Date of Patent: Apr. 21, 1998

[54] ADHESION PROMOTER FOR A LAMINATE COMPRISING A SUBSTANTIALLY LINEAR POLYOLEFIN

[75] Inventor: Gary L. Jialanella, 2005 Laurel La., Mich.

[73] Assignee: The Dow Chemical Company, Midland, Mich.

[21] Appl. No.: 520,149

[22] Filed: Aug. 28, 1995

[51] Int. Cl.$^6$ ............................................. B32B 27/32
[52] U.S. Cl. ........................ 428/424.2; 428/423.1; 428/424.8; 428/424.4; 428/463; 428/441; 428/492; 428/516; 428/520
[58] Field of Search ............................ 428/423.1, 424.2, 428/424.8, 500, 520, 463, 492, 441, 497, 516, 424.4; 525/63, 64, 69, 74, 78; 524/272, 270, 271

[56] References Cited

U.S. PATENT DOCUMENTS

| | | | |
|---|---|---|---|
| 3,645,992 | 2/1972 | Elston | 260/80.78 |
| 4,058,647 | 11/1977 | Inoue et al. | 428/474 |
| 4,198,327 | 4/1980 | Matsumoto et al. | 260/4 |
| 4,332,858 | 6/1982 | Saitoh et al. | 428/412 |
| 4,341,837 | 7/1982 | Katsuto et al. | 428/336 |
| 4,588,648 | 5/1986 | Krueger et al. | 428/475.8 |
| 4,954,573 | 9/1990 | Fry et al. | 525/327.6 |
| 4,966,947 | 10/1990 | Fry et al. | 525/327.6 |
| 5,234,996 | 8/1993 | Mori et al. | 525/123 |
| 5,272,236 | 12/1993 | Lai et al. | 526/348.5 |
| 5,278,272 | 1/1994 | Lai et al. | 526/348.5 |
| 5,324,800 | 6/1994 | Welborn, Jr. et al. | 526/160 |
| 5,346,963 | 9/1994 | Hughes et al. | 525/285 |
| 5,424,362 | 6/1995 | Hwang et al. | 525/71 |
| 5,460,870 | 10/1995 | Aurthurs | 428/285 |
| 5,591,792 | 1/1997 | Hattori et al. | 524/271 |

FOREIGN PATENT DOCUMENTS

| | | | |
|---|---|---|---|
| 0322045 | 12/1989 | European Pat. Off. | B32B 27/08 |
| 2 113 696 | 8/1983 | United Kingdom . | |
| 2 116 187 | 9/1983 | United Kingdom . | |

OTHER PUBLICATIONS

Derwent 94–275906 (JP 6206947).

*Primary Examiner*—Paul J. Thibodeau
*Assistant Examiner*—D. Lawrence Tarazano
*Attorney, Agent, or Firm*—Reid S. Willis

[57] ABSTRACT

The present invention is a laminate comprising a first substrate adhesively bonded to a second substrate through an adhesion promoter. The first substrate comprises a substantially linear olefin copolymer and the adhesion promoter comprises a polar group functionalized substantially linear olefin copolymer. The present invention is also an adhesion promoter that comprises a mixture of a copolymer of a $C_{2-20}$ olefin and an ethylenically unsaturated carboxylic acid or acid anhydride and a polar group functionalized substantially linear olefin copolymer or a polar group functionalized copolymer of ethylene and a $C_{3-20}$ olefin having a narrow molecular weight distribution, a random distribution of comonomer units along the polymer backbone, and a homogeneity index of at least 75. The present invention is useful in a variety of applications such as bathroom scales, shoe soles, carpet-backing, and automobile windshields.

16 Claims, No Drawings

5,741,594

ADHESION PROMOTER FOR A LAMINATE COMPRISING A SUBSTANTIALLY LINEAR POLYOLEFIN

BACKGROUND OF THE INVENTION

This invention relates to an adhesion promoter for a laminate comprising a substantially linear polyolefin elastomer.

Laminated structures comprising a plurality of polymeric layers are well known in the art. Such structures are disclosed in U.S. Pat. Nos. 4,058,647; 4,198,327; 4,332,858; 4,341,837; and 4,588,648; and European Patent Application No. 0 322 045 A2.

In order for the polymeric laminates to perform successfully, the polymeric layers must be adhered to avoid separation during use. U.S. Pat. No. 4,058,647 discloses that ethylene-vinyl alcohol copolymers may be laminated with a polymeric composition comprising both a modified and an unmodified polyolefin and a rubber component. U.S. Pat. No. 4,198,327 discloses that polycarbonates and ethylene-vinyl alcohol copolymers may be bonded together with a composition comprising a carboxylated polyolefin and a hydrocarbon elastomer. U.S. Pat. Nos. 4,332,858 and 4,341,837 disclose that olefin homopolymers and copolymers may be adhered to polycarbonates using an unhydrogenated block copolymer, such as a maleated block copolymer of styrene and butadiene. U.S. Pat. No. 4,588,648 discloses that polypropylene and ethylene-vinyl alcohol copolymers may be laminated with an adhesive layer comprising a grafted copolymer of an olefin and maleic anhydride and an ungrafted polypropylene. European Patent Application No. 0 322 045 A2 discloses that polycarbonate and ethylene vinyl alcohol, for example, may be laminated together using an adhesive composition comprising a carboxylic acid- or acid anhydride-modified polyolefin, such as a maleated polypropylene, and a selectively hydrogenated block copolymer having a block comprising predominantly a hydrogenated conjugated diene such as a saturated styrene-butadiene, or styrene isoprene block copolymer. The use of modified chlorinated, carboxylated polyolefins as primers that produce polymers having improved adhesion to substrates is disclosed in U.S. Pat. Nos. 4,954,573, and 4,966,947.

None of the above-cited references suggest an appropriate adhesive promoter for a laminate comprising a substantially linear olefin in copolymer as described in U.S. Pat. Nos. 5,272,236 and 5,278,272, both incorporated herein by reference. It would be an advance in the art to discover a suitable adhesion promoter for such copolymer.

SUMMARY OF THE INVENTION

The present invention is a laminate comprising:
a) a first substrate comprising a first substantially linear olefin copolymer;
b) an adhesion promoter superposing the first substrate, which adhesion promoter comprises a polar group functionalized second substantially linear olefin copolymer;
c) a tackifying resin admixed with the adhesion promoter, or an adhesive superposing the adhesion promoter or admixed therewith; and
d) a second substrate adhesively bonded to the first substrate;
wherein the first and second substantially linear olefin copolymers are characterized by having:

i) from about 0.01 to about 3 long chain branches per 1000 carbon atoms along the polymer backbone;
ii) a weight average molecular weight to number average molecular weight ratio of less than about 3.5;
iii) a melt flow index that is essentially independent of the polydispersity index; and
iv) a critical shear rate at the onset of surface melt fracture of at least 50 percent greater than the critical shear rate at the onset of surface melt fracture of a linear olefin polymer having about the same melt index and $M_w/M_n$; each substantially linear olefin copolymer being a copolymer of ethylene and a $C_3$–$C_{20}$ α-olefin.

In another aspect, the present invention is an adhesion promoter comprising a mixture of:
a) a copolymer derived from a $C_2$–$C_{20}$ olefin and an ethylenically unsaturated carboxylic acid or acid anhydride, and
b) a polar group functionalized substantially linear olefin copolymer having:
i) from about 0.01 to about 3 long chain branches per 1000 carbon atoms along the polymer backbone;
ii) a weight average molecular weight to number average molecular weight ratio of less than about 3.5;
iii) a melt flow index that is essentially independent of the polydispersity index; and
iv) a critical shear rate at the onset of surface melt fracture of at least 50 percent greater than the critical shear rate at the onset of surface melt fracture of a linear olefin polymer having about the same melt index and $M_w/M_n$; each olefin polymer being further characterized as a copolymer of ethylene and a $C_3$–$C_{20}$ α-olefin.

In yet another aspect, the present invention is an adhesion promoter comprising a mixture of:
a) a copolymer derived from a $C_2$–$C_{20}$ olefin and an ethylenically unsaturated carboxylic acid or acid anhydride, and
b) a polar group functionalized copolymer of ethylene and a $C_3$–$C_{20}$ α-olefin having a narrow molecular weight distribution, a random distribution of comonomer units along the polymer backbone, and a homogeneity index of at least 75.

DETAILED DESCRIPTION OF THE INVENTION

The first substrate of the laminate of the present invention comprises a first substantially linear olefin copolymer. Superposing the first substrate is an adhesion promoter comprising a polar group functionalized polymer of a second substantially linear olefin copolymer.

Alternatively, the adhesion promoter can comprise a polar group functionalized linear copolymer of ethylene and a $C_3$–$C_{20}$ α-olefin having a narrow molecular weight distribution, a random distribution of comonomer units along the polymer backbone, and a homogeneity index of at least 75. Such polymers (hereinafter referred to as the '992 polymers) are described by Elston in U.S. Pat. No. 3,645,992, and by Welborn in U.S. Pat. No. 5,324,800, each of which is incorporated herein by reference, and include those polymers available under the trade name TAFMER (Trademark of Mitsui Petrochemical) and EXACT (Trademark of Exxon Chemical).

The first and second substantially linear olefin copolymers (hereinafter referred to as the substantially linear olefin copolymers) are characterized by having 1) high melt elasticity; 2) high processability; 3) a polydispersity index of less than about 3.5; 4) about 0.01 to about 3 long chain branches per 1000 carbon atoms along the polymer backbone; and 5) a melt flow index that is essentially independent of the polydispersity index. The substantially linear olefin copolymers are further characterized by having a critical shear rate at the onset of surface melt fracture of at least 50 percent greater than the critical shear rate at the onset of surface melt fracture of a linear olefin polymer having about the same melt index and $M_w/M_n$.

The substantially linear olefin copolymers are copolymers of ethylene and at least one $C_3$–$C_{20}$ α-olefin, and optionally a $C_2$–$C_{20}$ acetylenically unsaturated monomer or a $C_4$–$C_{18}$ diolefin, such as 5-ethylidene-2norbornene, or an α,δ-diene including 1,5-hexadiene, 1,7-octadiene, and 1,9-decadiene. Preferably, the substantially linear olefin copolymers are copolymers of ethylene and a $C_4$–$C_{10}$ α-olefin, more preferably ethylene and 1-butene, 1-hexene, 4-methyl-1-pentene, or 1-octene. Most preferably, the substantially linear olefin copolymers are copolymers of ethylene and 1-octene.

The substantially linear olefin copolymers have from about 0.01, preferably from about 0.3, to about 3, and preferably to about 1, long chain branches per 1000 carbon atoms along the polymer backbone. Long chain branching is defined herein as a chain length of at least about 6 carbon atoms, above which the length cannot be distinguished by carbon NMR spectroscopy. The long chain branch can be about as long as the polymer backbone.

The polydispersity index of the substantially linear olefin copolymers (i.e., the molecular weight distribution, or the ratio of the weight average molecular weight to the number average molecular weight ($M_w/M_n$)), is less than 3.5, preferably from about 1.5 to about 2.5. The melt flow index ratio (i.e., the $I_{10}/I_2$, as measured by ASTM D-1238) is at least 5.63, preferably at least 6, more preferably at least 7, and is essentially independent of the polydispersity index, in contrast to conventional polyolefins which show a dependence of the melt flow index on the polydispersity index. This property is illustrated in FIG. 2 of U.S. Pat. No. 5,272,236, supra. The preparation of substantially linear olefin copolymers is described in detail in the '236 patent.

The density of the substantially linear olefin copolymers is generally in the range of from about 0:85 to about 0.96, and is preferably in the range of from about 0.85, more preferably from about 0.86, to about 0.89, more preferably to about 0.88 g/mL.

The first substrate may optionally contain other conventional additives such as heat stabilizers, weather stabilizers, antistatic agents, nucleating agents, fillers, pigments, dyes, fire retardants, and antiblocking agents. The first substrate may also comprise a mixture of substantially linear olefin polymers, having similar or widely varying weight average (or number average, for that matter) molecular weights. Thus, although substantially linear olefin copolymers have polydispersity indices of less than 3.5, the polydispersity index of the first substrate (as well as the adhesion promoter) is not limited thereto.

The adhesion promoter, which superposes the first substrate, comprises a polar group functionalized second substantially linear olefin copolymer or a polar group functionalized copolymer of ethylene and a '992 polymer. Such a polar group, which is present in sufficient quantities to enhance adhesive properties, is preferably grafted onto a preformed second substantially linear polyolefin or '992 polymer by any suitable means, including means known in the prior art. The polar group may also be incorporated through copolymerization of a suitable monomer containing the desired polar group. Examples of suitable polar groups include halo, particularly chloro and bromo, hydroxyl, carboxyl, carbonyl, phosphono, acid anhydride, amino, epoxy, mercapto, sulfate, sulfonate, amido, and ester groups. Of these, the carboxyl and acid anhydride groups that are grafted onto the preformed polyolefin are preferred. Examples of unsaturated carboxylic acid and acid anhydride compounds that can be grafted onto the preformed polymer include maleic acid, fumaric acid, itaconic acid, acrylic acid, methacrylic acid, crotonic acid, maleic anhydride, and itaconic anhydride. Maleic anhydride is a preferred grafting compound for the second substantially linear olefin copolymer.

Preferably, the polar group is grafted onto a second substantially linear olefin copolymer or '992 polymer which, in its preformed state, is substantially free of polar groups. The term "substantially free" is used herein to refer to a substantially linear olefin copolymer or '992 polymer that contains less than 10 weight percent polar groups based on the weight of the preformed polymer, preferably less than 5 weight percent, more preferably less than 1 weight percent, and most preferably less than 0.1 weight percent. The first substantially linear olefin copolymer is also preferably substantially free of polar groups.

The content of the grafted functional group in the second substantially linear olefin copolymer or a '992 polymer is sufficient to improve the adhesion of the first substrate, and is preferably in the range from about 0.05, more preferably from about 0.5, and most preferably from about 1, to preferably about 15, more preferably to about 10, and most preferably to about 5 weight percent, based on the weight of the second substantially linear olefin copolymer or '992 polymer.

The adhesion promoter preferably comprises a mixture of the grafted second substantially linear olefin copolymer or grafted a '992 polymer and a copolymer derived from a) a $C_2$–$C_{20}$ olefin, preferably a $C_2$–$C_4$ olefin, more preferably ethylene; and b) an unsaturated carboxylic acid or acid anhydride, preferably maleic acid, fumaric acid, itaconic acid, acrylic acid, methacrylic acid, crotonic acid, maleic anhydride, or itaconic anhydride, more preferably acrylic acid or methacrylic acid.

Preferably, the grafted second substantially linear olefin copolymer comprises from about 10, more preferably from about 20, and most preferably from about 40 weight percent, to about 90, more preferably to 80, and most preferably to 60 weight percent of the adhesion promoter, based on the total weight of the grafted second substantially linear olefin copolymer or grafted '992 polymer and the copolymer derived from the $C_2$–$C_{20}$ olefin and the unsaturated carboxylic acid or acid anhydride.

The laminate is processable (i.e., the adhesion promoter promotes adhesion) at a temperature below the melting point of the first substrate. Preferably, the laminate is processable at a temperature from about 20° C. to about 100° C., more preferably to about 60° C. and most preferably to about 40° C.

The adhesion promoter may be admixed with a tackifying resin at elevated temperatures, preferably from about 100° C. to about 160° C. to form a hot melt adhesive bonding layer between the first and the second substrates. The tackifying resin is compatible with the adhesion promoter and is typically an aliphatic resin, a polyterpene resin, a hydrogenated resin, or a mixed aliphatic aromatic resin.

Examples of tackifying resins include those available under the trade name ESCOREZ (Exxon Chemical Co.), PICCOTAC, PICCOVAR, PICCOLYTE (Hercules, Inc.), WINGTAC (Goodyear) and ZONARES (Arizona).

Alternatively, the laminate of the present invention may comprise any suitable adhesive that either superposes the adhesion promoter or is admixed therewith. The adhesive may be, for example, neat or solvent-based, or 1- or 2-part. Examples of suitable adhesives include, but are not restricted to, epoxy resins, urethanes, latexes, acrylates, elastomer-solvent cements, gums, and polysilicones.

A polyisocyanate compound or prepolymer, preferably a di- or triisocyanate compound or prepolymer, such as tris (4-isocyanatophenyl) thiophosphate, toluene diisocyanate, methylene di-p-phenylene isocyanate, or urethane polymers thereof, dissolved in a suitable solvent such as monochlorobenzene or ethyl acetate, can be used to promote solvent-based adhesion. For example, the polyisocyanate compound may be coated over the adhesion promoter layer; formulated with the adhesion promoter, and applied to the first substrate; or formulated with the solvent-based adhesive, and applied to the adhesion promoter layer.

The polyisocyanate compound or prepolymer is used in an amount sufficient to promote adhesion between the solvent-based adhesive and the adhesion promoter, preferably from about 0.1, more preferably from about 0.5, and most preferably from about 1, to about 25, more preferably to about 10, and most preferably to about 5 weight percent, based on the weight of the adhesion promoter.

Examples of commercially available polyisocyanate compounds or prepolymers include DESMODUR™ RF-E (Trademark of Miles Inc.), PAPI™ polymeric MDI (Trademark of The Dow Chemical Company) and UPACO 3570 (Manufactured by Worthen Industries, UPACO Division).

The isocyanate compound or precursor is also advantageously used in the presence of a catalyst. Suitable catalysts include divalent or tetravalent organotin catalyst such as dimethyltin dilaurate, dimethyltin dicarboxylate, dimethyltin dimercaptide, and stannous octoate; or amine catalysts.

The laminate of the present invention further comprises a second substrate adhesively bonded to the first substrate. The second substrate can be any suitable material such as leather, metal, plastic, rubber, glass, wood, or concrete.

The laminate of the present invention is useful for a variety of end-use applications, including bathroom scales, shoe soles, carpet-backing, and automobile windshields.

The following examples are for illustrative purposes only and are not intended to limit the scope of the invention.

EXAMPLE 1

Preparation and T-Peel Strength of a Polyolefin Elastomer/Leather Laminate

A hot melt adhesive formulation is prepared by mixing together at 150° C. until homogeneous, 50 g of ethylene-1-octene copolymer grafted maleic anhydride having a melt flow index of 0.3 g/10 min and a density of 0.87 g/mL; and PICCOVAR® AP-10 tackifying resin (50 g, Trademark of Hercules, Inc.). ESCOREZ® 5300 tackifying resin (75 g, Trademark of Exxon Chemical Company) is added to the mixture with stirring until homogeneous. The hot melt adhesive formulation is applied to a strip of ENGAGE® 8200 polyolefin elastomer (Trademark of The Dow Chemical Company). A laminate is prepared for a T-peel test by overlapping the shoe sole compound with a preheated (150° C.) abraded leather strip using a 7.6 cm overlap and a 760 pm bond thickness. The shoe sole strip is 15.2 cm×2.5 cm×0.32 cm, and the leather strip is 10 cm×2.5 cm×0.095 cm. The adhesive is cured at 100° C. for 30 min. The excess adhesive around the bonding is removed, and the joints are conditioned at the test temperature for 2 hours prior to testing. The T-peel strength is found to be 34 pli, as measured using an INSTRON® Tensile 4204 Testing System, with a crosshead speed of 25.4 cm/min, according to ASTM method D1876-72.

EXAMPLE 2

Room-Temperature Cured Epoxy Adhesive for Ethylene-1-Octene Copolymer/E-coated Metal Laminate Toluene (30.0 g), perchloroethylene (6.0 g), t-butanol (6.0 g), ethylene-1-octene copolymer grafted maleic anhydride having a melt flow index of 0.3 g/10 min and a density of 0.87 g/mL (0.34 g), and PRIMACOR® 3460 polymer blend (0.5 g, Trademark of The Dow Chemical Company) are mixed together in a beaker and heated to 80° C. until a homogeneous solution is formed. This adhesion promoter blend is cooled to 25° C., then applied as a thin film to a strip of ENGAGE™ 8200 ethylene-1-octene copolymer and allowed to dry at 25° C. for 24 hours. A homogeneous mixture of 12.5 g D.E.R.® 331 epoxy resin (Trademark of The Dow Chemical Company), 25.0 g ANCAREZ™ 2364X modifier (Trademark of Air Products and Chemicals, Inc.), and 10.0 g of ANCAMINE™ 2384X curing agent (Trademark of Air Products and Chemicals, Inc.) is applied to the primed strip, and 30-mil diameter glass beads are sprinkled on the strip to control thickness. E-coated metal and the ethylene-1-octene copolymer are then mated with a 7.6-cm overlap and the adhesive is cured at 25° C. overnight. The T-Peel strength is 40 pli.

EXAMPLE 3

Room-Temperature Cured Epoxy Adhesive for Ethylene-1-Octene Copolymer/E-coated Metal Laminate The procedure of Example 2 is repeated except that the adhesion promoter blend is a blend of 0.67 g of the ethylene-1-octene copolymer grafted maleic anhydride and 0.17 g of the PRIMACOR® 3460 polymer blend in the toluene/perchloroethylene/t-butanol solvent mixture. The T-Peel strength is 32 pli.

EXAMPLE 4

Room-Temperature Cured Epoxy Adhesive for Ethylene-1-Octene Copolymer/E-coated Metal Laminate The procedure of Example 2 is repeated except that the adhesion promoter blend is a blend of 0.17 g of the ethylene-1-octene copolymer grafted maleic anhydride and 0.67 g of the PRIMACOR® 3460 polymer blend in the toluene/perchloroethylene/t-butanol solvent mixture. The T-Peel strength is 38 pli.

What is claimed is:

1. A laminate comprising:
   a) a first substrate comprising a first substantially linear olefin copolymer;
   b) an adhesion promoter superposing the first substrate, which adhesion promoter comprises a polar group functionalized second substantially linear olefin copolymer;

c) a tackifying resin admixed with the adhesion promoter, or an adhesive superposing the adhesion promoter or admixed therewith; and d) a second substrate adhesively bonded to the first substrate through the adhesion promoter and the tackifying resin or adhesive;

wherein the first and the second substantially linear olefin polymers are characterized by having:

i) an $M_w/M_n$ of less than about 3.5;

ii) an $I_{10}/I_2$ of at least 5.63; and iii) a critical shear rate at the onset of surface melt fracture of at least 50 percent greater than the critical shear rate at the onset of surface melt fracture of a linear olefin polymer having the same melt index and $M_w/M_n$; each olefin polymer being further characterized as a copolymer of ethylene and a $C_3$–$C_{20}$ α-olefin.

2. The laminate of claim 1 wherein the adhesion promoter further comprises a copolymer derived from a $C_2$–$C_{20}$ olefin and an ethylenically unsaturated carboxylic acid or acid anhydride.

3. The laminate of claim 1 which is processable at a temperature from about 20° C. to about 100° C.

4. The laminate of claim 2 which is processable at a temperature from about 20° C. to about 40° C.

5. The laminate of claim 2 wherein the copolymer of the olefin and the ethylenically unsaturated carboxylic acid or acid anhydride is a copolymer of ethylene and acrylic acid, or ethylene and methacrylic acid.

6. The laminate of claim 5 wherein each substantially linear olefin copolymer is a copolymer of ethylene and 1-butene, 4-methyl-1-pentene, 1-hexene, or 1-octene.

7. The laminate of claim 6 wherein each substantially linear olefin copolymer is a copolymer of ethylene and 1-octene having a density of from about 0.86 to about 0.88 g/mL.

8. The laminate of claim 7 wherein the polar group functionalized second substantially linear olefin copolymer comprises an acid anhydride group or a carboxylic acid group grafted onto a preformed ethylene-1-octene copolymer.

9. The laminate of claim 8 wherein the polar group functionalized polymer comprises about 0.05 to about 10 weight percent of maleic anhydride grafted onto the preformed ethylene-1-octene copolymer, based on the weight of the preformed ethylene-1-octene copolymer.

10. The laminate of claim 9 wherein the weight-to-weight ratio of the maleic anhydride grafted ethylene-1-octene copolymer to the copolymer of ethylene and acrylic acid, or ethylene and methacrylic acid is in the range of about 20:80 to about 80:20.

11. The laminate of claim 10 wherein the ratio of maleic anhydride grafted ethylene-1-ocetene copolymer to the copolymer of ethylene and acrylic acid, or ethylene and methacrylic acid is in the range of about 40:60 to about 60:40.

12. The laminate of claim 2 wherein the second substrate comprises a metal, glass, wood, cement, plastic, rubber, or leather.

13. The laminate of claim 2, wherein the adhesive is prepared from an adhesive formulation comprising solvent.

14. The laminate of claim 13 wherein the adhesion promoter further comprises an isocyanate compound or prepolymer.

15. The laminate of claim 13 wherein the adhesive formulation contains an isocyanate compound or prepolymer.

16. The laminate of claim 13 wherein the adhesive is a urethane.

* * * * *